Figure 1:
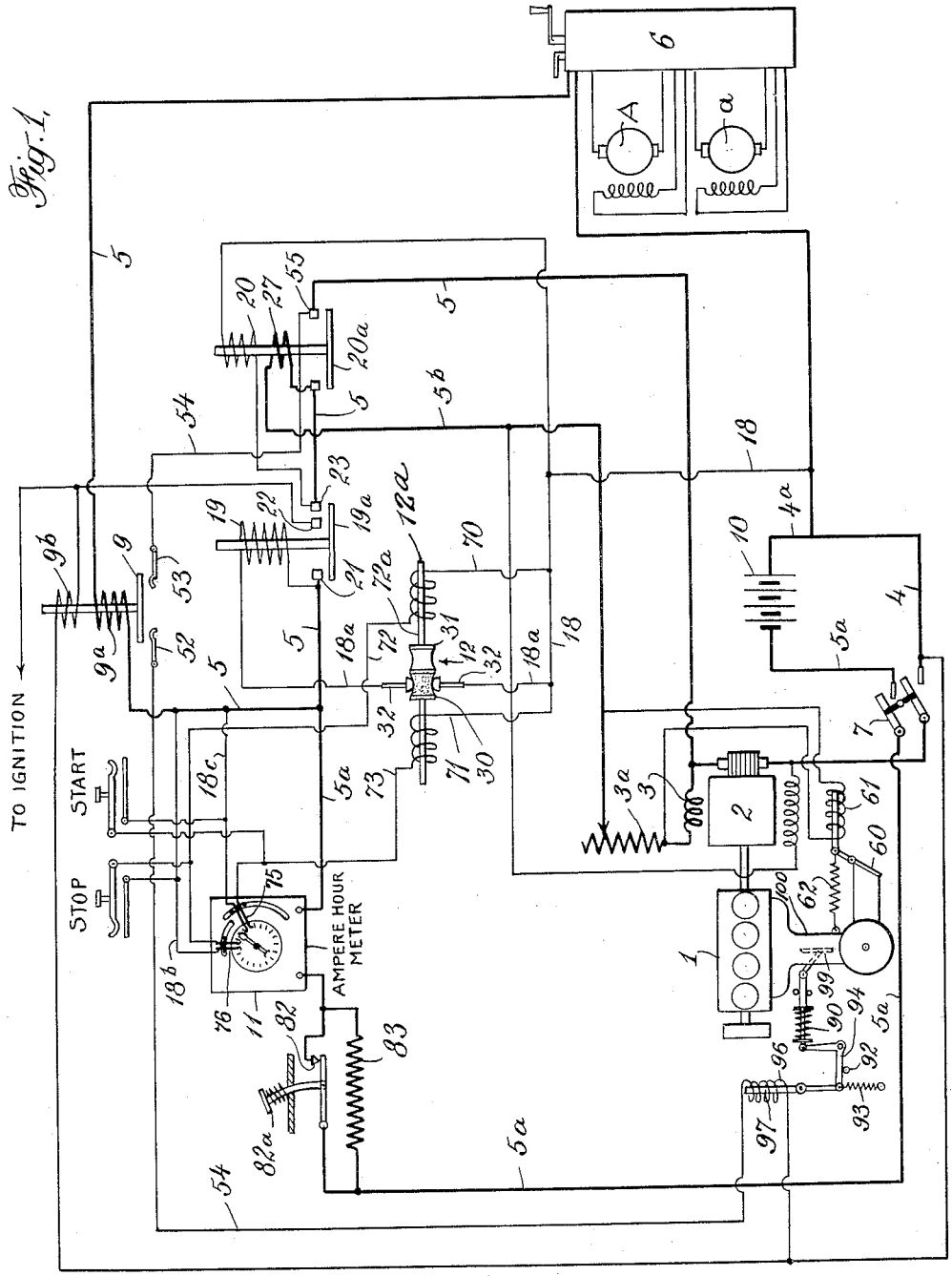

Jan. 27, 1931.  M. ARENDT  1,790,635
SELF CHARGING ELECTRIC VEHICLE
Filed Aug. 21, 1924   2 Sheets-Sheet 1

Jan. 27, 1931.  M. ARENDT  1,790,635
SELF CHARGING ELECTRIC VEHICLE
Filed Aug. 21, 1924   2 Sheets-Sheet 2
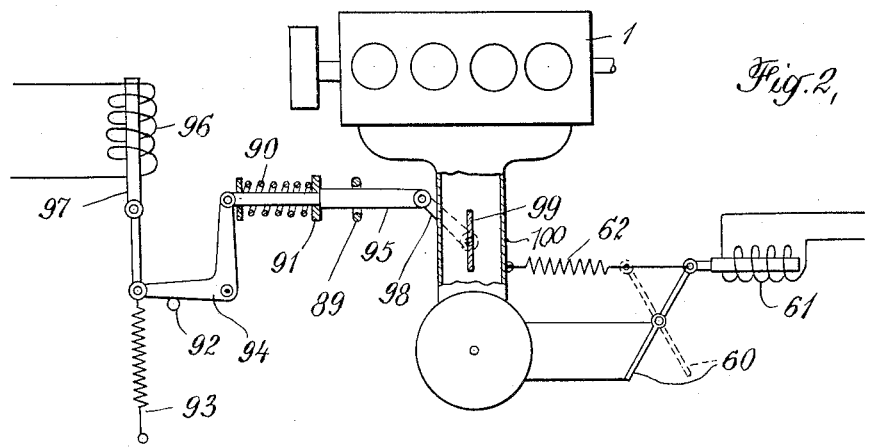
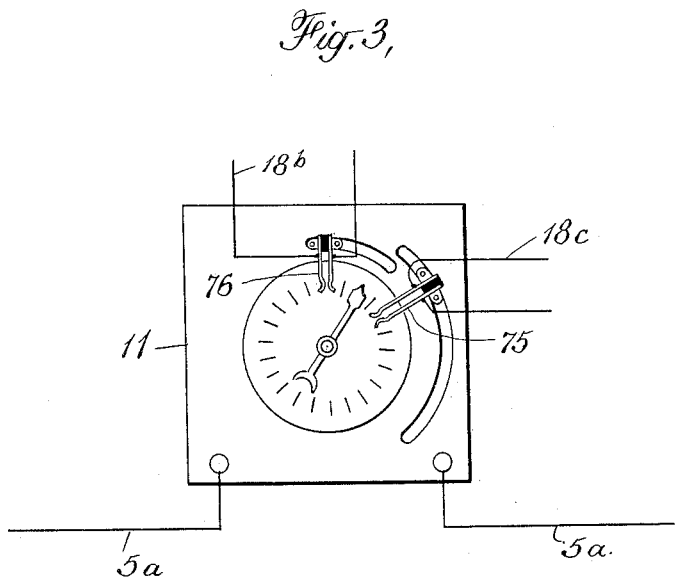
INVENTOR
Morton Arendt
BY
Pennie, Davis, Marvin & Edmonds
his ATTORNEY Patented Jan. 27, 1931

1,790,635

UNITED STATES PATENT OFFICE

MORTON ARENDT, OF NEW YORK, N. Y., ASSIGNOR OF ONE-HALF TO W. BROWN MORTON, OF NEW YORK, N. Y.

SELF-CHARGING ELECTRIC VEHICLE

Application filed August 21, 1924. Serial No. 733,252.

This invention relates to self-charging electric vehicles of the type in which the electric power which drives the vehicle is derived from a generator driven by an internal combustion engine or other suitable prime mover carried by the vehicle and delivering its output in part to the driving motor or motors of the vehicle and in part to a storage battery, which latter in turn supplies current to the driving motors when the power demands of the vehicle exceed the generator output.

In such a system the size, that is, the power rating, of the prime mover, is not determined by the power requirements of the vehicle at its maximum load condition of operation, but is theoretically determined by the average power consumption under normal conditions of operation. That is to say, if at the end of a ten hour run under normal operating conditions a watt-meter in the driving motor circuit showed a power consumption of say 240 k.w. hours, then a power plant capable of a continuous output of 24 k.w. (with due allowance for battery losses) should be sufficient to maintain the vehicle in constant operation. In practice, however, it is not possible to use a power plant of the theoretically possible size and maintain it in constant operation at its maximum output for the reason, primarily, that the power requirements of a vehicle, particularly a road vehicle, vary through such a wide range that the storage battery cannot, without being charged at a destructive rate, receive under light load condition the excess power which is required for normal load conditions.

In my co-pending applications, Ser. Nos. 508,191 and 659,300, filed, respectively, on October 17, 1921, and August 25, 1923, I have shown and described means for reducing the output of the power plant under certain conditions to prevent damage to the battery through charging at an excessive rate, and the mechanism shown and described in this application constitutes an improvement on the systems shown and described in my said co-pending applications, the principal object of such improvement being the provision of means whereby the output of the power plant is automatically controlled by the load on the driving motors of the vehicle and also by the condition of the battery whereby the battery will be charged more rapidly when it is in a condition to safely receive a charge at a higher rate and whereby the charging rate will be reduced when the condition of the battery necessitates a lower charging rate.

A further object of the invention is to provide means whereby the battery is automatically operated over its range of maximum efficiency, and is prevented from reaching a condition of full charge where it is particularly liable to injury through gassing and excessive charging.

A further object of the invention is to provide means for starting and stopping the internal combustion engine at will and also automatically depending upon the condition of the battery discharge, said means comprising a generator and engine control whereby the generator acts as a compound wound starting motor when the engine is to be started and a "choked" intake and full throttle opening is assured at starting regardless of the condition of the battery.

A further object of the invention is to provide a means whereby the operator may at will cut the battery out of the generator circuit to thereby permit the generator voltage to build up under light-load conditions and the excess power to be delivered to the vehicle motors for the purpose of giving a temporary excess speed to the vehicle as traffic conditions occasionally demand.

Other features of the invention will appear in the following description taken in connection with the accompanying drawings, wherein Fig. 1 shows the entire driving system;

Fig. 2 is a detail view on an enlarged scale of the internal combustion engine control; and Fig. 3 is a detail view of the ampere hour meter.

Referring to Fig. 1, 1 indicates the internal combustion engine, and directly connected to the prime mover 1 is a shunt wound generator 2 whose field is provided with an auxiliary series winding 3 which, with a resistance 3a is utilized when the generator serves as a starting motor but which is short-circuited when the generator is driven from the engine. The electric power is supplied from the generator through mains 4 and 5 and through the motor controller 6 to the driving motors A and a. I have illustrated two motors but it is to be understood that one motor driving the vehicle through a differential may be used or that motors may be located to drive two or four wheels, a motor per wheel being used, thus eliminating the differentials. The storage battery 10 is connected to the driving motors in parallel with the generator by mains 4a and 5a. The control includes a master switch 7, an ampere hour meter 11 located in the main 5a, an automatic switch 12, a second automatic switch 9, starting switches and other devices; all of which will be described later.

In the drawings I have made the connections for driving the vehicle in heavy lines and the connections which form part of the control only, such as the circuits of the starting devices, etc., in light lines.

The current from the battery is utilized in starting the car to operate the generator 2 as a starting motor for the gas engine, and to operate the propelling motors simultaneously if desired. The system is controlled primarily from the master switch 7, here illustrated as a double switch with one arm arranged to break the circuit through the main 4 from the generator to the motor controller and the other arm in the main 5a from the battery to the ampere hour meter, whereby the opening of the switch will simultaneously open the circuit between the generator and motors, the generator and batteries and the batteries and motors.

A line 18 from the main 4 is connected to one terminal of each of the two coils 70—72, 71—73 of the automatic switch 12. Terminal 72 of one of these coils leads to an open contact 76 on the face of the ampere hour meter, the other side of the contact being connected by wire 18b to main 5.

The automatic switch comprises the two coils 70—72 and 71—73 and a common armature core 12d on which is supported an insulated sleeve 30 which in turn carries a contact ring 31 of metal. The ring 31 and the adjacent portion of the sleeve 30 are formed with circumferential grooves which form seats for two spring pressed contacts 32 connected in a line 18a leading from the line 18 through which the coils 70—72 and 71—73 are energized, as well as the coil of an electrically controlled switch 20a in the main 5. A second switch 19a is arranged in the main 5 the coil 19 of which is energized through the line 18a and contacts 32. The operation of these two switches will be later described. When the armature core 12a is pulled to the left by coil 71—73 the circuit will be made through line 18a and the conductor ring 31 and when the core is drawn to the right by coil 70—72 the circuit will be broken by the insulating sleeve 30. The spring contacts 32 hold the core in either position against accidental dislodgment.

The ampere-hour meter, as shown in Fig. 3, comprises the customary face plate and dial marked to indicate the state of battery discharge. The contacts 76 are mounted for adjustment from the position of full charge on the dial to a position of about five-sixths full charge while the contacts 75 are mounted for adjustment around the face of the dial, through a range dependent upon the service of the vehicle, the range of adjustment, as shown, extending from about one-half to three-quarters full charge. When the index hand of the ampere-hour meter is in position to close contacts 76, coil 70—72 of switch 12 is energized and the insulated piece 30 is pulled to the right to open lead 18a as shown and interrupt the circuit of coil 19. The contact strap of the switch 19a then falls and opens the circuit of main 5, between contacts 21 and 23, totally disconnecting the generator from the system and opening the engine ignition circuit at 22. The engine is thus stopped and the generator disconnected from the system so that the vehicle will be operated by the battery alone until the battery is discharged to a degree predetermined by the setting of the adjustable contacts 75. The opening of switch 19a also breaks the circuit through the coils of switch 20a thereby allowing that switch to drop, breaking the connection across the contacts 24—25 and opening the short-circuit around the starting resistance 3a and series field 3 of the generator, thus setting the generator for operation as a motor when the engine is again started.

Terminal 73 of the coil 71—73 goes to contacts 75 on the ampere hour meter. When the index hand of the ampere-hour meter passes over contacts 75 they are momentarily closed and current flows from wire 18 through coil 71—73, through contacts 75 to wire 18c to main 5. This energizes coil 71—73 and the armature core of coil 12 is drawn to the left so that lead 18a is closed by the metallic contact 31. The ridge between the insulating ring 30 and the conducting ring 31 and the spring contacts 32 prevent the core 12a being dislodged by the vibration of the vehicle. When the line 18a is closed through the metallic contact 31, coil 19 of switch 19a is energized and its core is magnetically lifted to connect contacts 22 and 23 with terminal 21 of main 5 connected to main 5a of the battery through the ampere-hour meter and the master switch 7. Current will then flow through the series coil 27 around the core of switch 20a, thence through main 5b to the generator 2, mains 4 and 4a completing the circuit between generator 2 and the battery 10, whereby the generator, acting as a motor will be driven by the battery to rotate the crankshaft of the engine. When the current flows from the battery to the generator, coil 27 is differential with respect to coil 20 and when the starting current in coil 27 diminishes, (that is, when the engine starts) the pull of the coil 20 will overcome the pull of coil 27 and the contactor will be lifted, closing contacts 24—25 and short-circuiting the resistance 3a and series field 3 of the generator. Contact 22 which is connected to main 5 by the lifting of core of coil 19 is connected by lead 81 to the ignition circuit, not shown. The ignition circuit being thus energized, the engine is caused to operate as such and drive the generator. To facilitate starting the engine it is also desirable to provide a "choke" for the air intake as indicated at 60 which is closed when starting but opened as soon as the engine begins to drive the generator. To this end the choke is provided with an operating solenoid 61 whose coil is energized from the main 5b in parallel with the resistance 3a but is normally held open, by spring 62. In order to permit the operator to control the starting and stopping of the engine at will, but without interfering with the automatic control through the ampere hour meter, the leads to the movable contacts 75 are provided with a push button contact in parallel therewith, marked "Start" in the drawing, while the contacts 76 are similarly provided with a push button marked "Stop".

By making both the contacts 75 and 76 adjustable on the ampere-hour meter the range over which the battery is to be operated may be varied to suit different conditions of service. Usually the contacts will be set at about two-thirds and seven-eighths full charge, respectively. This is the most efficient range of battery operation and danger of gassing and over-charge is prevented.

In operating a vehicle under ordinary traffic conditions there are frequently times when the difference between the generator output and the requirements of the motors A—a is so great that the battery may suffer from an injurious rate of charge, for example, when the vehicle is stopped in traffic, coasting or running under light load. The automatic switch 9 and its connected devices are provided to safeguard the battery under these conditions. The switch is provided with a series coil 9a located in lead 5 to the motor controller. When the current flowing through coil 9 falls to the predetermined low safe limit the core of the relay drops and connects contacts 52—53 in a circuit 54 extending from main 4 to a contact 55 of the switch 20a. The closing of circuit 54 energizes the coil 96 of a solenoid whose core 97 is connected with a bell-crank 98, which is connected to the butterfly valve 99 in the engine intake 100. The adjustment of the valve by the solenoid reduces the flow of the explosive mixture to the engine cylinders and reduces the output of the engine and the generator 2 to such an extent that the entire output may go to the batteries without injury.

By connecting the circuit 54 to the generator circuit through the contact 55 the auxiliary field winding 3 and resistance 3a are coupled in the circuit of the coil 96 when the switch 20a is open and the strength of the coil under these conditions is such that it cannot overcome the resistance of the spring 93 which holds the throttle fully open. Hence, when the generator is operated as a starting motor the throttle remains fully open, but as soon as the engine is started and the switch 20a is closed the coil 96 becomes effective.

When the current required by the driving motors increases to a point such that the surplus current supplied to the battery at the normal setting of the system is not sufficient to injure the battery, the coil 9 of the relay will lift its core, breaking the contacts 52—53, thus restoring the engine throttle to its normal setting.

The switch 9 may be controlled entirely by the coil 9a in the manner described to reset the engine whenever the current to the motors reaches a predetermined minimum, regardless of the condition of the battery. The action of the switch may, however, be modified with advantage to maintain the engine at its full load operation when the battery is discharged to a considerable extent, until the current consumed by the driving motors falls to a lower value than when the battery is more nearly fully charged. To this end the core of the solenoid of the switch 9 is provided with a potential coil 9b in a circuit extending from the contact 22 to the main 4. The coil 9b is wound in a direction to be differential to the coil 9a, hence when the battery is near full charge and the voltage of the system is correspondingly high, the lifting effect of the coil 9a will be overcome when a larger current is flowing through main 5 to the driving motors than when the battery is fairly well discharged and the voltage of the system is correspondingly low. By this arrangement the engine will not be reset to its low output position when the batteries are discharged until the current consumed by the driving motors reaches a low value and the batteries will be charged by the full surplus from the generator when otherwise they would receive but a small surplus due to the reduced output of the generator.

The engine throttle may be adjusted to a fixed postion whenever the switch 9 operates, regardless of the condition of the battery, but it is preferable to have the engine operate at a greater output when the battery is discharged to a considerable extent than when it is more nearly fully charged in order that the battery may be recharged as rapidly as its condition warrants. To this end the throttle control illustrated in detail in Fig. 2 is employed. The throttle 99 is actuated through an arm 98 connected through a link 95 with a bell-crank 94 connected to the core 97 of the solenoid 96. A light spring 93 normally (that is, when the switch 9 is open and the solenoid de-energized) holds the bell-crank against a stop 92, in which position the throttle is fully open. Supported on the link 95 is a spring 90 which is held under an initial tension by a washer 91 abutting against a shoulder formed on the link 95. Stops 89 are positioned to engage the washer 91 when the throttle has been adjusted to a position which may be termed the maximum low output position. Movement of the link beyond that position will obviously effect a compression of the spring 90 which may be of any desired initial resistance and which is designed to rapidly increase in resistance as it is further compressed. The coil 96 of the solenoid is a shunt coil whose strength varies with the voltage of the system which is determined by the condition of discharge of the battery. Whenever the coil 96 is energized by the closing of the switch 9 the throttle will be closed to the extent represented by the position of the stop 89. If the battery is discharged to an appreciable extent the solenoid will not have strength to compress the spring 90 and the engine will operate at its maximum low output. As the battery voltage builds up, the strength of the solenoid will increase, compressing the spring 90 and closing the throttle to a greater and greater extent, thus preventing the battery being charged at a rate greater than its condition warrants.

Under some operating conditions it is desirable to supply the current to the driving motors at a higher voltage than can be obtained with the battery in the circuit. When the vehicle is operating along a level stretch of road the driving motors cannot take the full output of the generator at the battery voltage and the surplus current will be absorbed by the battery. Under these conditions the vehicle may be operated at a greater speed, if desired, by temporarily cutting the battery out of the circuit. To this end a switch 82 may be provided in the main 5a leading to battery from the main 5, a high resistance shunt 83 being provided around the switch to prevent arcing at the contacts. The switch will preferably be operated by a foot button 82a working against a stiff spring which normally holds the switch closed, so that the operator has to hold the spring compressed in order to keep the switch open. When the switch is open the voltage of the system will build up until the entire output of the generator is utilized by the driving motors, thus driving the vehicle at an increased speed.

The operation of the system as a whole will, it is believed, be readily understood from the foregoing description and will not be further described.

This application is a continuation in part of my co-pending applications above referred to, and it will be understood that the improvements described in this application may be used in connection with the constant-watt control shown and described in the said applications. It will also be understood that the details of the mechanism herein described may be variously modified without departing from the spirit of the invention or the scope of the appended claims.

I claim:

1. A vehicle propulsion system comprising an internal combustion engine, an electric generator driven by said engine, an electric motor for driving said vehicle, a storage battery connected to said generator and said motor so as to be charged by current from said generator when the load on the driving motor is below normal and to assist said generator in supplying current to said motor when said load is above normal means for maintaining the engine and generator at a substantially fixed output while the load on the driving motor is above a predetermined value, less than the intended maximum generator load and means controlled primarily by the load on the driving motor for reducing the power output of said internal combustion engine and generator when the load on the driving motor falls below such value.

2. A vehicle propulsion system comprising an internal combustion engine, an electric generator driven by said engine, an electric motor for driving said vehicle, a storage battery connected to said generator and said motor so as to be charged by current from said generator when the load on the driving motor is below normal and to assist said generator in supplying current to said motor when said load is above normal means for maintaining the engine and generator at a substantially fixed output while the current flowing to the driving motor is above a predetermined value, less than the intended maximum generator load and means controlled primarily by the current flowing through the driving motor for reducing the power output of the internal combustion engine and the generator when the flow of current to the driving motor falls below such value.

3. A vehicle propulsion system comprising an internal combustion engine, an electric generator driven by said engine, an electric motor for driving said vehicle, a storage battery connected to said generator and said motor so as to be charged by current from said generator when the load on the driving motor is below normal and to assist said generator in supplying current to said motor when said load is above normal means for maintaining the throttle of said engine at a fixed open position while the load on the driving motor is above a predetermined value, less than the intended maximum generator load and means controlled primarily by the load on the driving motor for reducing the power output of said internal combustion engine and generator when the load on the motor falls below such value, said means comprising a series coil in the line from the generator to the motor, a throttle for said engine, and means controlled by said coil for partially closing said throttle when the current through said series coil falls below a predetermined minimum.

4. A vehicle propulsion system comprising an internal combustion engine, an electric generator driven by said engine, an electric motor for driving said vehicle, a storage battery connected to said generator and said motor so as to be charged by current from said generator when the load on the driving motor is below normal and to assist said generator in supplying current to said motor when said load is above normal, means controlled primarily by the load on the driving motor for reducing the power output of said internal combustion engine and generator when the load on the driving motor falls to a predetermined point below normal, and means controlled by the state of charge of the battery for varying said predetermined point.

5. A vehicle propulsion system comprising an internal combustion engine, an electric generator driven by said engine, an electric motor for driving said vehicle, a storage battery connected to said generator and said motor so as to be charged by current from said generator when the load on the driving motor is below normal and to assist said generator in supplying current to said motor when said load is above normal, means controlled primarily by the load on the driving motor for reducing the power output of said internal combustion engine and generator when the load on the motor falls to a predetermined point below normal, said means comprising a series coil in the line from the generator to the motor, a throttle for said engine, and means controlled by said coil for partially closing said throttle when the current through said series coil falls below a predetermined minimum, and means controlled by the state of charge of the battery for varying said predetermined point, said means comprising a shunt coil across said battery terminals and operating in conjunction with said series coil.

6. In a vehicle propulsion system comprising an internal combustion engine, an electric generator driven by said engine, an electric motor for driving said vehicle, a storage battery connected to said generator and said motor so as to be charged by current from said generator when the load on the driving motor is below normal and to assist said generator in supplying current to said motors when said load is above normal, means controlled primarily by the load on the driving motor for reducing the power output of said internal combustion engine and generator when the load on the driving motor falls to a predetermined point below normal, and means controlled by the state of charge of the battery for varying the extent to which the power output is reduced.

7. In a vehicle propulsion system comprising an internal combustion engine, an electric generator driven by said engine, an electric motor for driving said vehicle, a storage battery connected to said generator and said motor so as to be charged by current from said generator when the load on the driving motor is below normal and to assist said generator in supplying current to said motor when said load is above normal, and means controlled primarily by the load on the driving motor for reducing the power output of said internal combustion engine and generator when the load on the driving motor falls to a predetermined point below normal, said means comprising a normally open throttle for said engine, a coil whose force is proportional to the voltage of the system for closing said throttle, and resilient means for opposing the action of said coil, and means controlled by the load on the driving motors for energizing said coil.

In testimony whereof I affix my signature.
MORTON ARENDT.